Nov. 25, 1947. C. KISKY Re. 22,938

TOOTHBRUSH

Original Filed Dec. 23, 1943

Christian Kisky
Inventor

By E. G. Buckholz
Attorney

Reissued Nov. 25, 1947

Re. 22,938

UNITED STATES PATENT OFFICE 22,938

TOOTHBRUSH

Christian Kisky, Oswego, Oreg.

Original No. 2,378,641, dated June 19, 1945, Serial No. 515,387, December 23, 1943. Application for reissue September 28, 1945, Serial No. 619,165

8 Claims. (Cl. 15—167)

This invention relates generally to the art of dentistry and particularly to a method of and a brush for cleaning teeth.

The main object of this invention is to develop a method whereby teeth may be properly cleaned without injury to the teeth and gums, and whereby the muscles of the face and tongue are used to furnish the motive power for the brushing operation in order that the muscles of these members may be properly exercised, and accordingly strengthened.

A further object is to provide a method of brushing whereby the facial appearance of the brusher will be improved by the correction of flabby muscles commonly present in people of advancing years.

A third object is the production of a brush especially designed for insuring the proper inclination of the bristles during the brushing operation, as well as to so shape the contour of the work-engaging side of the ends of the bristles that they will follow closely into the depressions and crevices between the teeth with a gentle and non-injurious action.

I accomplish these and other objects in the manner set forth in the following specification as illustrated in the accompanying drawing, in which.

Figures 1, 2:
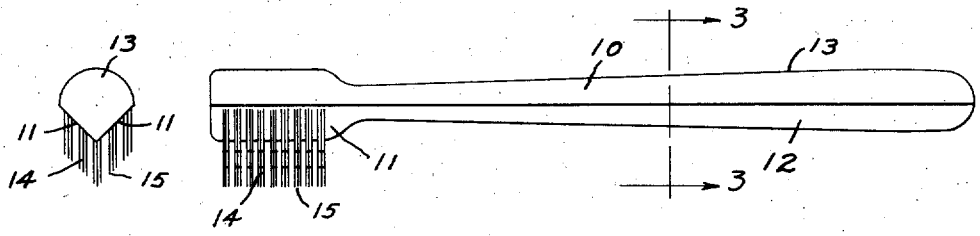
Fig. 1 is a side elevation of a brush constructed in accordance with one form of the present invention.
Fig. 2 is an end elevation of Fig. 1.

Before entering into an explanation of this invention, it is to be understood that brushing the teeth is perhaps one of the most important portions of the daily toilet and is often most neglected and improperly performed. Relatively few people have any definite method or orderly procedure. Most people feel that they have done a thorough job if they scrub the teeth vigorously, often doing more harm than good.

In devising my method for cleansing or brushing of the teeth, I have focused my attention on the principal element, namely the brush. The conventional brush, if not properly used, can easily become an instrument of tooth destruction. A fast scrubbing stroke, for example, can eventually cut a tooth down to a nerve, especially at the gum margin. This is particularly true with soft teeth.

A tooth brush functions by having the individual bristle contact the particle of matter on the surface of the tooth or gum and then dislodging it and pushing it ahead of the bristle until it loses contact and can be washed away.

The dental area being very irregular and full of crevices makes it difficult to reach the bottoms of the crevices, due to the fact that the bristles are elastic or springy and can go into the irregularities or depressions only if the speed of the brush movement will permit the bristles to spring back or recover after being bent. In other words, if the brush is stroked too fast, the bristles will bounce over the depressions much as a tire bounces over depressions in a roadway. If, on the other hand, a slow stroke is used the bristles can spring into the depressions and crevices. In addition to the slow stroke it is necessary that the proper angle should be maintained. This is substantially 45 degrees between the bristle and the line of travel so as to allow the bristles to spring down and also so that the bristle will not cut the tissues, either hard or soft. The proper stroke might be likened to a correct paint brush stroke and there should be sufficient pressure exerted on the brush to force the bristles sideways into the deep crevices, and also to compress the gum tissue sufficiently to get a milking action of the blood in the direction of brush travel, which should always be toward the incisal or occlusal edge.

In order to provide a way of stimulating the oral circulation so as to get the blood to these areas, I have provided a novel form of tooth brush. Referring in detail to the drawing, the same will be seen to consist of a handle 10, whose bristle-bearing faces 11 are substantially normal to each other and parallel with the front sides 12 of the handle 10, the purpose being to enable the user to better direct the movements of the brush.

The back 13 is preferably rounded or straight. It will be noted that the bristles 14 are of substantially uniform length, making the tooth-engaging tips 15 parallel with the faces 11.

Figures 3, 4, 5, 6, 7:
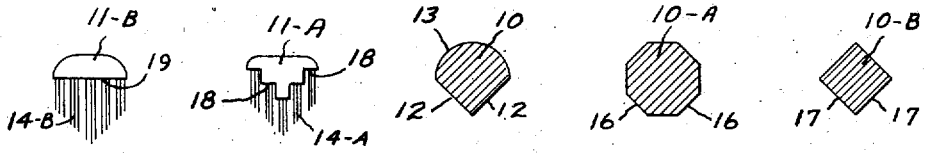
Fig. 3 is a section taken along the line 3—3 of Fig. 1.
Fig. 4 is a cross-section of a modified form of handle.
Fig. 5 is a cross-section of another modified form of handle.
Fig. 6 is an end elevation of a modified form of brush.
Fig. 7 is an end elevation of a further modified form of brush.

It will be noted in Fig. 4 that the shape of the handle 10A is octagonal. Here again the sides 16 would be parallel with the sides 11, and in Fig. 5 the cross-section of the handle 10B is square and the sides 17 are normal to each other, and of course normal to the sides 11.

In Fig. 7 is shown a modified form of cross-section of the brush holding element 11A, in which the rows of bristles 14A are seated in steps 18.

In the form of the device shown in Fig. 6 the face 19 of the bristle holding element 11B is straight, but the bristles 14B are of varying length and the ones in the center are the longest, and those along the edge the shortest, the contour being the same as in the first described forms of the device.

It will be observed from the foregoing that when the brush is used it naturally falls into the correct position for a proper tooth brushing, owing to the flattened handle sides 12, 16 and 17, which are parallel with the brushing lines 25 of the brush.

In the application of the brush it is of course held and guided by the hand but it is actually used by causing the muscles of the face and tongue to provide the impetus for the stroke. That is, the muscles of the face move the brush during the exterior brushing and the tongue moves the brush during the interior brushing. The movement is accomplished by merely inserting the brush by hand to the proper position and at the right angle and well up on the mucous membrane on the uppers or low on the lowers, and then causing the facial muscles to supply all the impulsion to move the brush down or up to the occlusal or incisal edges, as the case may be. When brushing the inner sides of the teeth, the tongue is used to provide the necessary movement.

By the practice of my method and use of my brush, certain distinct advantages are gained. First, it stimulates circulation of the cheeks and face, bringing added blood to the gum tissues, permitting the brush to move the blood toward the terminal fissures in the gums.

Secondly, it improves the muscle tone in the face and on the jaws, giving the individual a firm muscle development of these members, thereby improving and maintaining the facial contour and keeping wrinkle development at a minimum.

Third, the design of the brush also allows a slow side stroke which will allow the edge to go up under the gums and clean these also.

Figure 8:
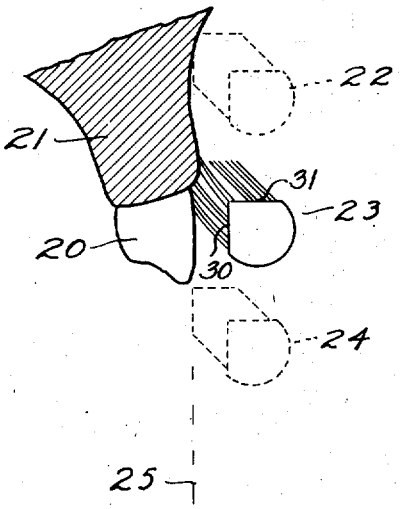
Fig. 8 is a diagrammatic view illustrating the manner in which the brush of the invention is intended to be used.

The method in which the brush is intended to be used is more clearly illustrated in the diagrammatic view of Fig. 8 in which the upper teeth are indicated at 20 and the upper gum at 21. The brush is first positioned well up on the gum as indicated in dotted lines 22 and with the bristles inclined so that the plane of the bristle ends next adjacent the gum is parallel with the surface of the gum. The brush is then moved downwardly toward the incisal edge of the teeth with the desired amount of pressure exerted thereagainst and as the bristles move from the gum onto the teeth as indicated at 23 they will spring into the crevice between the gum and teeth so as to effectively dislodge any particles which may be located therein. Due to the fact that the bristles are inclined at an angle with respect to the surface of the teeth, the teeth will be effectively wiped clean with a minimum of abrasive action taking place upon the surface thereof. Furthermore, because of the fact that the outermost ends of all of the bristles on one side of the brush head terminate in a common plane the ends of all such bristles will engage with the teeth and be effective in the cleaning operation. The bristles on the other side of the brush head provide a backing for those bristles the ends of which are engaging with the teeth so as to stiffen them and minimize the bending of the bristles to an ineffective position.

By reason of the fact that the handle is provided with a pair of plane surfaces extending longitudinally thereof and which surfaces are parallel with corresponding planes of the bristle ends the parallel relation between the planes of the bristle ends of the surfaces of the gums and teeth may very readily be controlled by the hand. It is understood, that the upper teeth are to be cleansed while the brush is held in a position as shown in Fig. 8 and that the brush is to be rotated through substantially 90 degrees for cleaning the lower set of teeth. In other words, both sets of teeth are not contacted by the brush during a single stroke and the plane surfaces 12, 16 or 17 on the brush handle aid in preventing rolling or rocking of the handle in the hand during the brushing stroke from the upper position 22 to the lower position 24.

It is pointed out that in an ordinary toothbrush as provided heretofore having bristles so arranged in the head that during usage they engage the teeth perpendicularly to the surface thereof, the ends of the bristles scratch into the tooth tissue with an action much like tines on a garden rake. Any pressure exerted on the brush merely imbeds the ends of such bristles in the soft tissue and the brush serves as a cutting tool. This is evidenced by prevalence of gingival recession and tooth abrasion at the neck of the tooth of a great percentage of dental patients.

With the tooth brush of the present invention in which the ends of all of the bristles terminate in one or two planes inclined at an angle with respect to the direction of the bristles full contact is had between the ends of all of the bristles terminating in one of such planes and the teeth with a minimum of pressure. The teeth are cleansed with a wiping action due to the angle of inclination of the bristles and scratching and cutting of the tooth and gum tissues is avoided.

It will be apparent from the description given that my brush as shown and described incorporates two sets of bristles which are separate and distinct except that the central row of tufts along the ridge of the brush head is common to both sets. The bristles of only one side of the brush head are effective during any single stroke. Thus with reference to Fig. 8, during the stroke from position 22 to position 24 only the bristles extending from the surface 30 effectively engage the teeth 20. The bristles anchored in the surface 31 will become effective only as the position of the brush is shifted in the hand such as may be necessary for bushing other teeth. In the broadest aspect, therefore, my present invention resides in a toothbrush including a handle with a head on one end thereof the head having a flat elongated front surface on which a plurality of bristle tufts are anchored and a back surface, the back surface meeting the flat front surface along the opposite side edges thereof. In considering the basic structure including only one set of bristles, for example, those mounted in the surface 30, the second set of bristles mounted in the surface 31 may be neglected and the surface 30 regarded as the front surface while surface 31 for all practical purposes may be regarded as a part of the back surface of the brush head. It will be observed that all of the bristle tufts extending from the surface 30 are parallel with each other and are inclined at an angle to the surface 30, the angle of inclination being normal to the longitudinal direction of the flat surface as shown more clearly in the side elevation of Fig. 1. Furthermore it may be observed that the body of the brush head is wholly disposed on the opposite side of the plane of the flat surface 30 with respect to the bristle tufts extending from this surface. Furthermore the outer ends of the bristle tufts define a plane substantially parallel to the flat bristle bearing surface 30 of the bush head.

What I claim is:

1. A brush of the class described comprising a handle and a brush head having bristles disposed thereon characterized by having the tips of the bristles formed into two normally intersecting planes, said handle having longitudinal flattened faces along the hand-engaging portion thereof characterized by having two of said faces parallel with the planes of the bristle tips.

2. An elongated brush of the class described, having a handle and bristles trimmed to form a ridge of two normally intersecting planes extending longitudinally with said brush and having the bristle side of the handle provided with two normally intersecting faces parallel to the bristle faces.

3. A toothbrush comprising a continuous handle and brush head having the hand-engaging portion and the bristle bearing portion formed in two normally intersecting planes and having bristles of uniform length extending from the bristles bearing portion, the outermost tips of the bristles occupying two normally intersecting planes.

4. A brush of the class described comprising a handle and a brush head having a multiplicity of bristles disposed thereon, the tips of all of said bristles formed into two intersecting planes, the angle between said planes through the bristles being less than 180 degrees, said handle having two longitudinal flattened faces along the hand-engaging portion thereof parallel with the planes of the bristle tips.

5. A toothbrush comprising a handle, said handle including a bristle bearing portion having a pair of adjacent intersecting plane surfaces, a plurality of bristles anchored in said bristle bearing portion and extending parallel with each other from both of said plane surfaces, the outer ends of said bristles all terminating in a pair of planes parallel with the corresponding planes of the bristle bearing portion in which said bristles are anchored.

6. A brush of the class described comprising a handle and a brush head having bristles disposed thereon, all of said bristles being of the same length and extending parallel with each other, all of said bristles having the tips thereof formed into two intersecting planes, the angle between said planes adjacent said handle being less than 180 degrees, the line of intersection of said planes extending parallel with said handle.

7. A toothbrush comprising a handle and a brush head provided with bristles, all of said bristles being parallel and of substantially uniform length, the outermost tips of all of said bristles terminating in two intersecting planes, the bristles at the intersection of said planes defining a ridge extending longitudinally of said handle.

8. A tooth brush comprising a handle and a brush head having bristles disposed thereon, said brush head including a pair of intersecting planar bristle bearing surfaces immediately adjacent each other, the angle between said bristle bearing surfaces through the brush head being less than 180°, said handle having two longitudinal flattened faces along the hand engaging portion thereof parallel with the planes of said bristle bearing surfaces.

CHRISTIAN KISKY.

REFERENCES CITED

The following references are of record in the file of this patent:

UNITED STATES PATENTS

| Number | Name | Date |
|---|---|---|
| 164,353 | Wayne | June 8, 1875 |
| 461,661 | Bowman | Oct. 20, 1891 |
| 958,371 | Danek | May 17, 1910 |
| 1,477,390 | Sloan | Dec. 11, 1923 |
| 1,753,290 | Graves | Apr. 8, 1930 |
| 1,914,240 | Caldwell | June 13, 1933 |
| 2,088,839 | Coney et al. | Aug. 3, 1937 |
| 2,154,352 | Peterson | Apr. 11, 1939 |
| 2,230,171 | Vorhees et al. | Jan. 28, 1941 |
| 2,244,615 | Garcin | June 3, 1941 |